United States Patent [19]

Tamaru et al.

[11] Patent Number: 5,107,478
[45] Date of Patent: Apr. 21, 1992

[54] TILT DEVICE FOR AN OPTICAL HEAD

[75] Inventors: Takuya Tamaru; Hiromitsu Suzuki, both of Hamamatsu, Japan

[73] Assignee: Yamaha Corporation, Hamamatsu, Japan

[21] Appl. No.: 360,310

[22] Filed: Jun. 2, 1989

[30] Foreign Application Priority Data

Jun. 7, 1988 [JP] Japan ............................... 63-140202
Jun. 7, 1988 [JP] Japan ............................... 63-140203
Jun. 7, 1988 [JP] Japan ............................... 63-140204

[51] Int. Cl.$^5$ ............................................. G01J 1/20
[52] U.S. Cl. ................................ 369/44.32; 369/44.11
[58] Field of Search ............... 369/44.32, 44.33, 44.11, 369/44.15, 44.17, 44.21, 44.25, 44.27, 44.38

[56] References Cited

U.S. PATENT DOCUMENTS 4,634,853  1/1987  Kanamaru .................... 369/44.32

*Primary Examiner*—Roy N. Envall, Jr.
*Assistant Examiner*—Hung T. Dang
*Attorney, Agent, or Firm*—Spensley Horn Jubas & Lubitz

[57] ABSTRACT

A tilt device for controlling the optical axis of an optical head in an optical disc playback device for optical discs such as a Laser Vision Disc and a Compact Disc in a perpendicular relation to the surface of an optical disc comprises a tilt mechanism for tilting a feed shaft disposed in the radial direction of an optical disc and having an optical pickup mounted reciprocably thereon so as to change the angle of optical axis of the optical pickup, a detector for detecting distance between the optical pickup and the optical disc and producing a detection signal, and a servo system responsive to the detection signal for controlling the tilt mechanism to maintain the distance between the optical pickup and the optical disc constant. In a preferred form, the feed shaft is fixedly secured to a base frame at its end portion nearer to the center of the optical disc and the free end of the feed shaft is moved by the tilt mechanism toward or away from the optical disc thereby to bend the feed shaft in conformity with flexion of the optical disc.

4 Claims, 5 Drawing Sheets

TILT DEVICE FOR AN OPTICAL HEAD

BACKGROUND OF THE INVENTION

This invention relates to a tilt device for controlling the optical axis of an optical head in an optical disc playback device for playing back optical discs such as a Laser Vision Disc (LV) and Compact Disc (CD) in a perpendicular relation to the surface of an optical disc and, more particularly, to a tilt device of such type capable of performing servo-control so as to maintain distance between the optical pickup and the surface of an optical disc constant.

In an optical disc playback device, an optical head including an optical pickup is used for picking up signals recorded on the disc surface of the optical disc. Picking up of signals is usually effected by displacing the optical pickup in the radial direction of the optical disc with the optical axis of the optical pickup being maintained perpendicular to the disc surface regardless of position of the optical pickup.

Optical discs, however, often have flexion originally caused by actions of heat and gravity or are bent downwardly in their outer peripheral portion due to their weight when they are loaded in the optical disc playback device. The amount of flexion is particularly large when the optical disc is of a large diameter such as a video disc. When such flexion occurs, the optical axis of the optical pickup tend becomes inclined and deviated from the perpendicular relation to the disc surface.

A tilt control therefore has been practiced for controlling the angle of the optical pickup so as to maintain the optical axis constantly perpendicular to the disc surface.

An example of a prior art tilt control device is shown in FIGS. 7 and 8. In this prior art device, there is provided a pivoting axis 3 in parallel with an optical disc D and normally to the radial direction of the optical disc D in an intermediate portion between the center and the outer periphery of the optical disc D on a base frame 2 on which a drive motor 1 for rotating the optical disc D is mounted. A subframe 4 is pivotably supported on this pivoting axis 3.

A pair of feed shafts 6 along which the optical pickup 5 is guided in sliding movement in the radial direction of the optical disc D are fixedly secured at both ends thereof to this subframe 4. A tilt feed screw 7 which is in threaded engagement with the subframe 4 at its end portion nearer to the outer periphery of the optical disc D is rotated by a drive motor 8 to change the distance between the subframe 4 and a base frame 2 and thereby pivot the subframe 4 about the pivoting axis 3.

For controlling this tilt mechanism, a tilt angle sensor 9 is provided adjacent to the optical pickup 5 and the tilt drive motor 8 is controlled in response to a detection signal produced by the tilt angle sensor 9 to apply servo for maintaining the optical axis of the optical pickup constant.

There is another prior art tilt mechanism as shown in FIG. 9.

In this tilt mechanism, a feed shaft 6 which is parallel with an optical disc D and disposed in the radial direction of the optical disc D is fixedly secured at both ends thereof on a base frame 2 on which a disc drive motor 1 is mounted. A subframe 4 which is reciprocable along the feed shaft 6 is provided.

There is provided a shaft 13 which is pivotable about a pivoting axis 3 which is parallel with the optical disc D and normal to the radial direction of the optical disc D and an optical pickup 5 is mounted on this shaft 13.

A tilt feed screw (not shown) which is in threaded engagement with an end portion of the shaft 13 nearer to the outer periphery of the optical disc D is rotated by a tilt drive motor (not shown) to change the distance between the subframe 4 and the shaft 13 and thereby change the angle of the optical pickup 5 together with the shaft 13 by pivoting the shaft 13 about the pivoting axis 3.

For controlling this tilt mechanism, the same servo device as that shown in FIG. 7 is employed. Namely, the tilt drive motor is controlled in response to a detection signal produced by the tilt angle sensor 9 provided adjacent to the optical pickup 5 to incline the shaft 13 so that the optical axis of the optical pickup 5 is maintained at a constant angle.

In both the tilt mechanism shown in FIG. 7 in which the feed shafts themselves are inclined and the tilt mechanism shown in FIG. 9 in which the shaft 13 which is separate from the feed shaft 6 is inclined, the servo control of the tilt mechanism is performed in such a manner that the angle of the optical axis of the optical pickup is maintained constant in response to a value detected by the tilt angle sensor 9. If, in these prior art tilt mechanisms, however, the optical axis of the optical pickup is made perpendicular to the disc surface of the optical disc D regardless of the position of the optical pickup in the radial direction of the optical disc D, distance between the optical disc D and the optical pickup 5 changes from L1 to L2 between a position nearer to the center of the optical disc D and a position nearer to the outer periphery thereof as shown in FIGS. 9 and 10, when there is a large flexion in the optical disc D.

For this reason, a focus stroke in a focus servo system must be made large in order to focus laser beam on the disc surface and this is extremely inconvenient in the design of the optical disc playback device.

It is, therefore, the first object of the invention to provide a tilt device for an optical head capable of maintaining the optical axis of an optical pickup approximately perpendicular to a bent surface of an optical disc with a simple construction and with a relatively small focus stroke in the focus servo system.

Further, if flexion occurring in an optical disc D is closely observed, an optical disc D having such flexion has a curved surface which bends downwardly toward the outer periphery of the optical disc D. In the prior art tilt mechanism in which the linear feed shaft 6 secured at its ends on the subframe 4 is tilted with the subframe 4, the problem that the linear feed shaft 6 cannot cope with the arcuate flexion of the optical disc D becomes more serious as the optical pickup 5 proceeds to the outer periphery of the optical disc D.

Besides, since the pivoting axis 3 about which the subframe 4 of the tilt mechanism shown in FIG. 7 is disposed intermediate between the center and the outer periphery of the optical disc D so as to minimize the range of pivoting of the subframe 4, the mounting position of the pivoting axis 3 is spaced away from the center spindle. As a result, it becomes necessary to determine this mounting position accurately because otherwise the optical pickup 5 would not be able to move along the feed shaft 6 in exact radial direction of the optical disc D so that alignment after assembly of the device would become necessary.

Further, the prior art device is complex in its structure because the tilt mechanism requires the subframe 4 and this subframe 4 is mounted on the base frame 2 through the pivoting axis 3. In addition, the prior art device requires space in vertical direction, particularly in the vicinity of the disc drive motor 1, for allowing the tilt operation.

It is, therefore, the second object of the invention to provide a tilt device which has eliminated these disadvantages in the prior art tilt device.

In the prior art tilt devices shown in FIGS. 7 and 9, the servo control is performed in such a manner that the angle of the optical axis of the optical pickup 5 is made perpendicular in accordance with a detection signal provided by the tilt angle sensor 9 which is provided separately from the optical pickup 5. There has arisen the problem in these prior art devices that the center of the tilt angle sensor 9 is not in agreement with the center of the optical pickup 5 with resulting occurrence of a detection error.

Besides, in the prior art tilt devices using the tilt angle sensor 9 which is separate from the optical pickup 5, the angle of the optical disc D cannot be detected in an area between the optical pickup 5 and the tilt angle sensor 9 when the optical pickup 5 is positioned at the nearest position to the center of the optical disc D so that tilt control over the entire playback range cannot be made.

Furthermore, detection of the angle of the optical disc D by the tilt angle sensor 9 depends upon laser beam reflected from the surface of the optical disc D so that, when there is dust or scar on the surface of the optical disc D, there occurs an error in the detected signal.

It is, therefore, the third object of the invention to provide a tilt device capable of performing tilt control so as to make the optical axis of an optical pickup approximately perpendicular to the disc surface of the optical disc over the entire playback range of the optical disc without employing a tilt angle sensor.

SUMMARY OF THE INVENTION

The tilt device for an optical head achieving the above described first object of the invention comprises tilt means for tilting a feed shaft disposed in the radial direction of an optical disc and having an optical pickup mounted reciprocably thereon so as to change the angle of optical axis of the optical pickup, detection means for detecting distance between the optical pickup and the optical disc and producing a detection signal, and servo means responsive to the detection signal for controlling the tilt means to maintain the distance between the optical pickup and the optical disc constant.

According to the invention, the tilt servo is applied to maintain the distance between the optical pickup and the optical disc constant regardless of the type of the tilt means provided for the feed shaft so that the focus distance becomes constant and the tilt servo performs substantially a part of focus servo. As a result, even if there is flexion in the optical disc, the focus servo can be performed with the same focus stroke that would be employed in applying focus servo on a plane surface so that the focus stroke can be minimized. With this tilt servo, the optical axis of the optical pickup is maintained approximately perpendicular to the optical disc surface and laser beam can be focused adequately on the optical disc surface. Thus, a reproduced signal can be obtained with an angle error within an allowable error range with a simple structure. Moreover, since the distance between the optical pickup and the optical disc is detected instead of the angle of the optical pickup, not only an optical type sensor but also various other means for detecting distance may be employed with resulting ease in the design of the optical disc playback device.

The tilt device achieving the above described second object of the invention comprises all of the elements of the tilt device achieving the first object of the invention and, besides, its feed shaft is fixedly secured to a base frame at its end portion nearer to the center of the optical disc and its tilt means comprises means for moving the other end of the feed shaft toward or away from the optical disc to cause the feed shaft to bend in conformity with flexion of the optical disc.

According to this tilt device, since the feed shaft is fixedly secured to the base frame at its end portion nearer to the center of the optical disc, the feed shaft can be bent by the tilt means provided on the free end side of the feed shaft so that the feed shaft is bent in conformity with flexion of the optical disc. As a result, the distance between the optical pickup and the optical disc can be maintained constant and besides the optical axis of the optical pickup can be made nearly perpendicular to the optical disc with close proximity so that an accurate reproduced signal with minimum angle error can be obtained.

Moreover, the necessity for the subframe is obviated and the structure of the tilt device can be simplified. Further, a vertical moving range of the feed shaft is made smaller with resulting saving in the space.

The tilt device achieving the above described third object of the invention comprises all of the elements of the tilt device achieving the first object of the invention and, besides, its detection means detects the distance between the optical pickup and the optical disc on the basis of a focus drive DC voltage produced by the optical pickup.

According to the invention, since a focus drive DC voltage of the optical pickup is detected regardless of the type of the tilt means provided for the feed shaft and the tilt control is performed so that the detected value coincides with a predetermined constant value, the tilt servo can be performed over the entire playback range of the optical disc. Besides, since reflected laser beam from the bit surface of the optical disc is utilized, the adverse effect caused when the detection signal is obtained from the surface of the optical disc is eliminated and a reproduced signal can be obtained with high accuracy.

Preferred embodiments of the invention will now be described with reference to the accompanying drawings.

BRIEF DESCRIPTION OF THE DRAWINGS

In the accompanying drawings.

DESCRIPTION OF PREFERRED EMBODIMENTS

Figure 1:
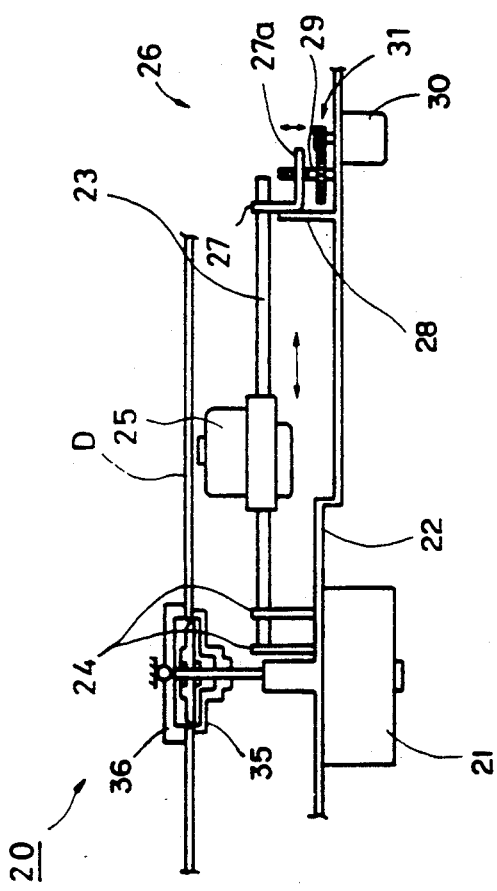
FIG. 1 is a front view showing an embodiment of the tilt device for an optical head according to the invention.
Figure 2:
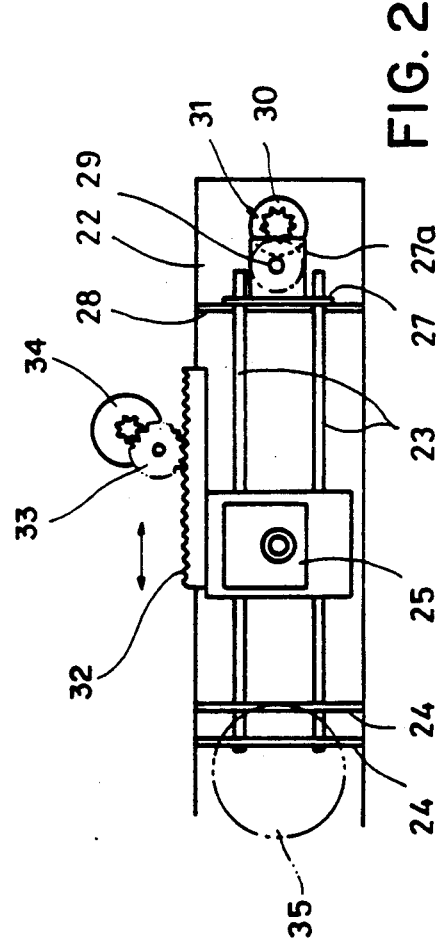
FIG. 2 is plan view of the same embodiment.

An embodiment of the invention is shown in FIGS. 1 and 2. A tilt device 20 for an optical head includes a base frame 22 on which mechanical component parts of the optical disc playback device such as a disc drive motor 21 for rotating an optical disc D are mounted. On the base frame 22 are disposed a pair of feed shafts 23 on both sides of a hypothetical line which extends in parallel with and in the radial direction of the optical disc D. An end each of these feed shafts 23 is fixedly secured, in a cantilever form, to a pair of brackets 24 provided in the vicinity of the center of the optical disc D.

An optical pickup 25 for detecting a laser beam signal is mounted reciprocably on the feed shafts 23 in such a manner that the optical axis of the optical pickup 25 moves in the radial direction of the optical disc D.

The feed shafts 23 are connected at their end portions on the side of the outer periphery of the optical disc D (i.e., free end portions) to a tilt arm 27 having an arm portion 27a. The tilt arm 27 can be guided vertically along a guide plate 28 provided on the base frame 22.

The arm portion 27a is formed in the central portion thereof with a female screw and a tilt feed screw 29 supported rotatably on the base frame 22 is in threaded engagement with the female screw of the arm portion 27a. By rotating the tilt feed screw 29 through a tilt drive motor 30 and gear 31, the pair of feed shafts 23 can be bent about points which are located slightly outside of the brackets 24. The tilt arm 27, tilt feed screw 29, gear 31 and tilt drive motor 30 constitute tilt means 26 for tilting the feed shafts 23.

As a feed mechanism for reciprocating the optical pickup 25 in the radial direction of the optical disc D along the feed shafts 23, a rack 32 is provided on the side of the optical pickup 25 and a pinion 33 which is in mesh with the rack 32 is rotated by a feed motor 34.

The servo means for controlling this tilt means 26 functions to maintain the distance between the optical disc D and the optical pickup 25 constant. An example of such servo means is shown as a servo system 40 in FIG. 3. In this example, a focus drive DC voltage of the optical pickup 25 is utilized as a signal for detecting the distance between the optical disc D and the optical pickup 25.

This focus drive DC voltage is applied to a differential amplifier 43 through a differential amplifier 41 and a low-pass filter 42 and a control voltage is supplied from the differential amplifier 43 to the tilt drive motor 30 through a power amplifier 44 so that the value of the focus drive DC voltage supplied to the input of the amplifier 43 will become equal to a reference voltage supplied to another input of the differential amplifier 43.

Upon receipt of the control voltage, the tilt feed screw 29 is rotated and the tilt arm 27 is vertically moved to bend the feed shafts 23 in conformity with the flexion of the optical disc D whereby servo is applied in such a manner that the distance between the optical pickup 25 and the optical disc D is maintained at a constant value.

In operation, the optical disc D is loaded on a turntable 35, and clamped against the turntable with a clamper 36. Then, the optical disc D is rotated by the drive motor 21 for starting playback. If there is flexion in the optical disc D, there arises change in the distance between the optical pickup 25 and the optical disc D with a result that there arises change also in the focus drive DC voltage of the optical pickup 25. Then, the servo system 40 supplies a control voltage based on the difference between the focus drive DC voltage and a refeference voltage to the tilt drive motor 30 to perform the servo control.

Since the focus drive DC voltage detected by the optical pickup 25 is derived from laser beam irradiated from the optical pickup 25 and reflected from the bit surface of the optical disc D, the focus drive DC voltage is not affected by dust or scar on the optical disc D and the detection of distance can be achieved with high precision with minimum error.

By this tilt servo control, the feed shaft 23 is bent from a point in the vicinity of the brackets 24 on the side of the center of the optical disc D substantially in conformity with the flexion of the optical disc D and therefore simulating the flexion in approximate radius of curvature.

Figure 4A:
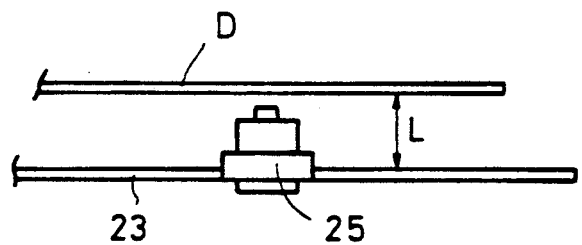
FIGS. 4A and 4B are diagrams for explaining operation of the servo system shown in FIG. 3.
Figure 4B:
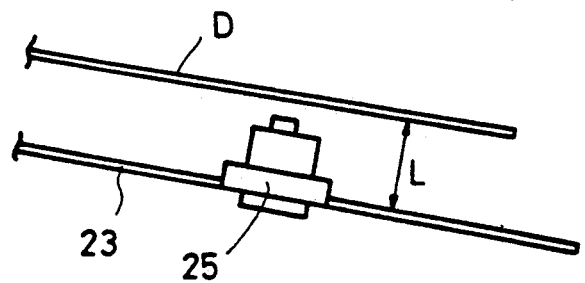

By this tilt servo control, distance L between the optical pickup 25 and the optical disc D becomes, as shown in FIG. 4B, equal to distance L shown in FIG. 4A where the optical disc D has no flexion whereby the distance between the optical pickup 25 and the optical disc D is maintained constant regardless of whether there is flexion in the optical disc D.

The optical pickup 25, therefore, is driven for playing back the optical disc D in conformity to the contour of the optical disc D so that the optical axis of the optical pickup 25 is held substantially perpendicular to the surface of the optical disc D and the laser beam is focused on the optical disc D.

Since the tilt servo control is made in such a manner that the feed shaft 23 is bent in conformity to the flexion of the optical disc D and the distance L between the optical disc D and the optical pickup 25 is maintained constant, the laser beam from the optical pickup 25 can be focused on the surface of the optical disc D more accurately than in the tilt servo in which the angle of the optical pickup 25 is maintained constant.

Besides, since the optical pickup 25 is utilized concurrently as the sensor for the tilt control, the distance signal necessary for the tilt control can be detected simultaneously with the detection of the reproduction signal so that the tilt control can be performed in the entire range in which the optical pickup 25 can pick up a reproduction signal whereby an area in which detection of a signal for tilt control is not possible is completely eliminated.

Figure 5:
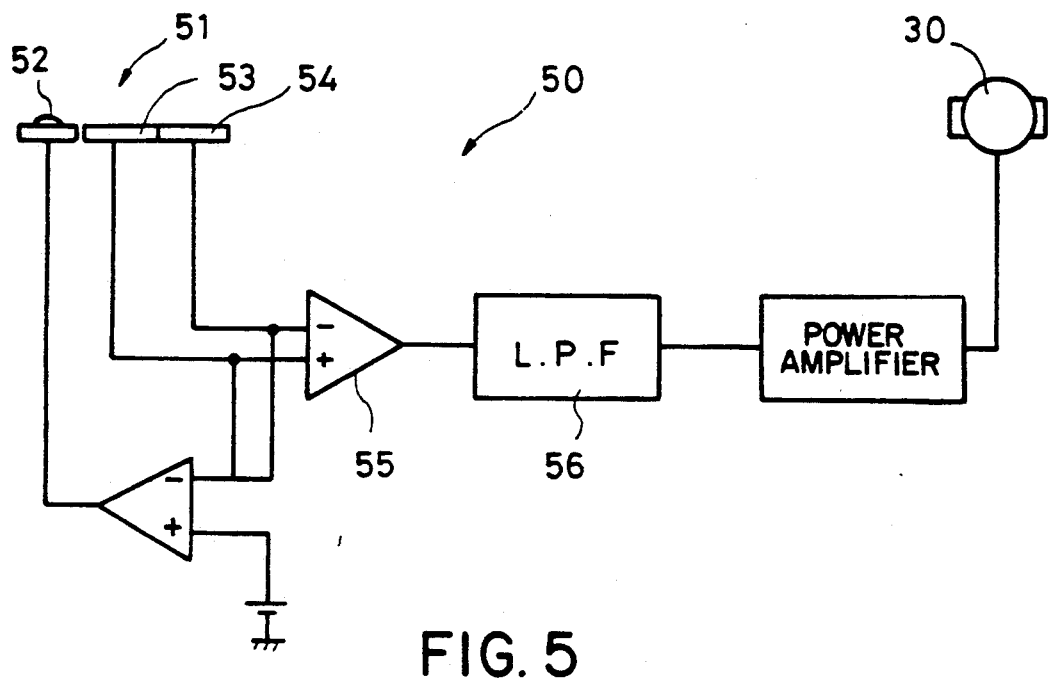
FIG. 5 is a block diagram showing another example of the servo system of the tilt device.

Another example of the servo system will be described with reference to FIGS. 5 and 6 which show a servo system 50 in which an optical type sensor is used separately from the optical pickup 25.

The optical type sensor 51 used in this servo system 50 includes an LED 52 and a couple of photo-sensors 53 and 54. Laser beam irradiated on the optical disc D is received by the photo-sensors 53 and 54 and the distance between the optical pickup 25 and the optical disc D is detected on the basis of difference in the amounts of laser beam received by these photo-sensors 53 and 54.

Figure 6A:
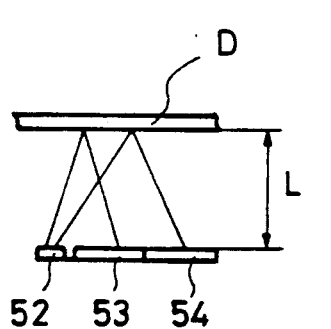
FIGS. 6A and 6B are diagrams for explaining operation of the servo system shown in FIG. 5.
Figure 6A:
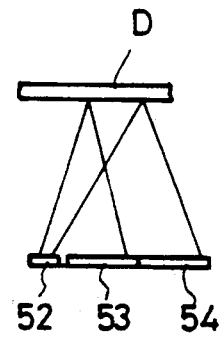
Figure 6A:
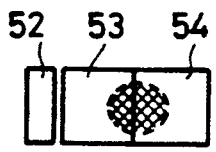
Figure 6B:
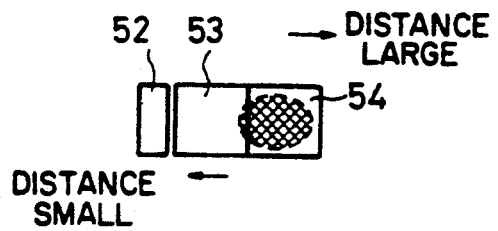

If, as shown in FIG. 6A, the distance between the optical pickup 25 and the optical disc D is of a predetermined value, the same amount of laser beam is received by each of the photo-sensors 53 and 54 whereas if, as shown in FIG. 6B, the distance is deviated from the predetermined value, the amount of laser beam received by one of the photo-sensors 53 and 54 becomes larger than the amount received by the other whereby such deviation in the distance is detected.

In the servo system 50, detection signals from the photo-sensors 53 and 54 are supplied to a low-pass filter 56 through a differential amplifier 55 and the servo control is performed to maintain the distance between the optical pickup 25 and the optical disc D constant by supplying, as required, a control voltage to a tilt drive motor 30 through a power amplifier 57 to make the amount of laser beam received by the photo-sensors 53 and 54 equal to each other. The angle of the optical axis of the optical pickup 25 and the distance between the optical pickup 25 and the optical disc D thereby are corrected to predetermined values.

Figure 3:
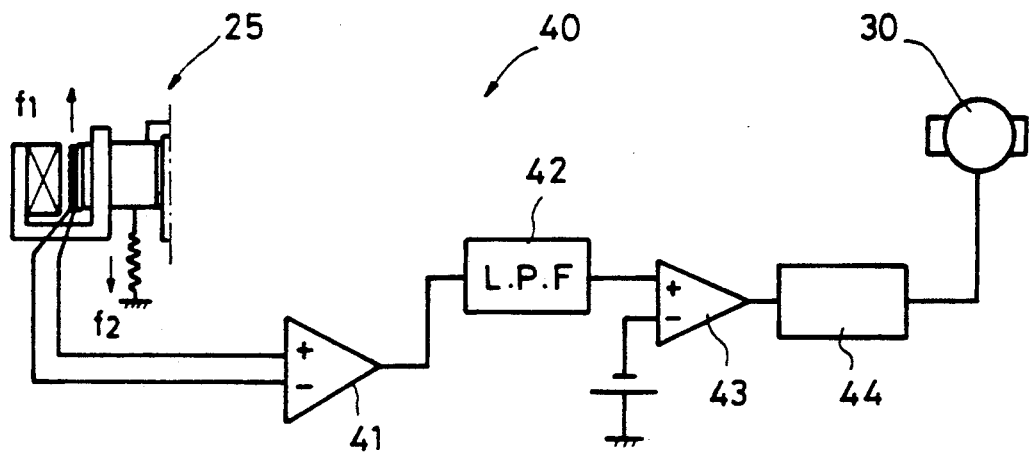
FIG. 3 is a block diagram showing an example of the servo system of the tilt device.

By the servo control of the tilt means 26 by the servo system 50 using the optical type sensor 51 as described above, the distance between the optical pickup 25 and the optical disc D can be maintained constant as in the servo system 40 shown in FIG. 3 and the playback of the optical disc D can be performed without enlarging the focus stroke of the focus system.

In the above described embodiment employing the tilt means by which the feed shafts are bent, the feed shafts 23 can be supported at a point near the disc drive motor 21 and, as a result, the feed shafts 23 can be easily arranged in parallel with the radial direction of the optical disc D without necessity of adjusting them for alignment.

Since the feed shafts 23 are caused to bend, the amount of vertical displacement of the feed shafts 23 accompanying tilting thereof in the vicinity of fixed ends thereof is relatively small and, accordingly, space in the vicinity of the disc drive motor 21 can be saved and freedom of design for mounting the optical pickup 25 increases.

The state of bending of the feed shafts 23 can be adjusted by adjusting rigidity thereof or a point at which the force excercised by the tilt means acts whereby close simulation of bending of the feed shafts 23 to the flexion of the optical disc D can be achieved.

In the above described embodiment, a pair of feed shafts 23 are employed. The feed shaft however is not limited to this but it may be of any form if it can be bent by applying force by rotation of the tilt drive motor. For example, the feed shaft may consist of only one feed shaft or may be of a plate-like configuration.

Figure 7:
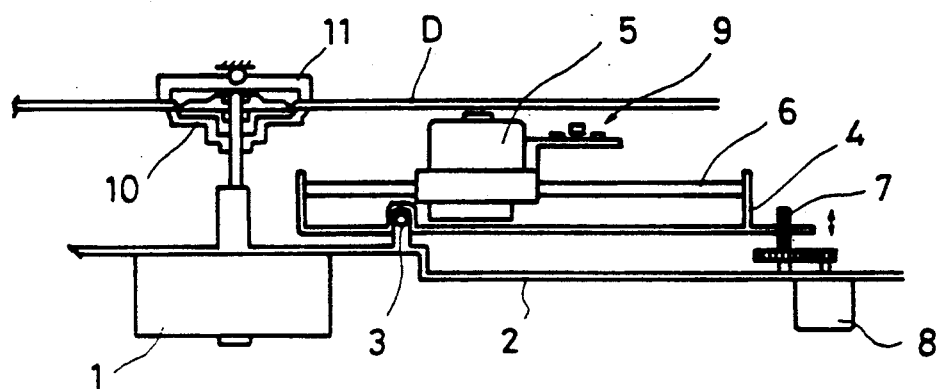
FIG. 7 is a front view of a prior art tilt device.
Figure 8:
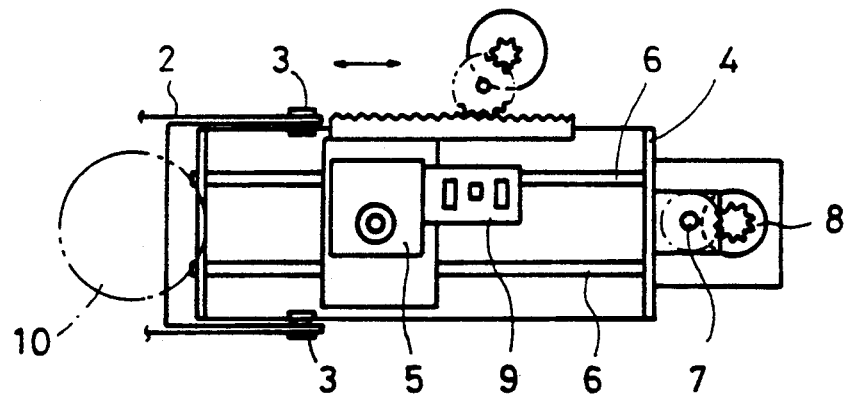
FIG. 8 is a plan view thereof.
Figure 9:
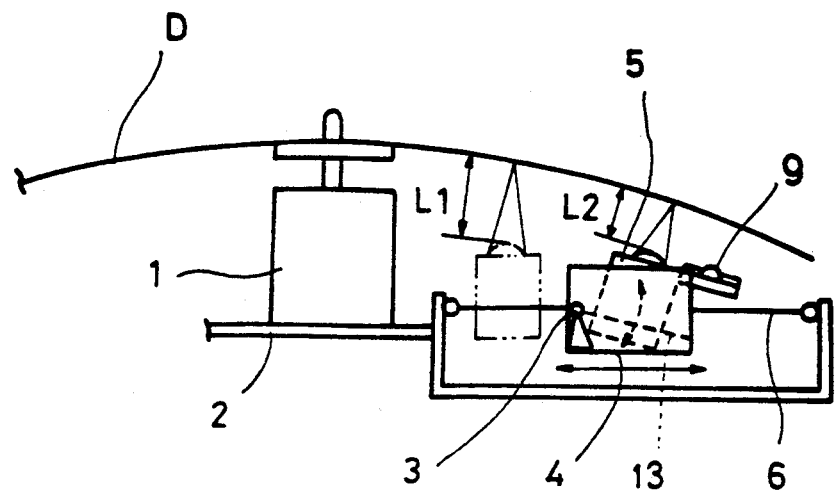
FIG. 9 is a schematic diagram showing another prior art tilt device.
Figure 10:
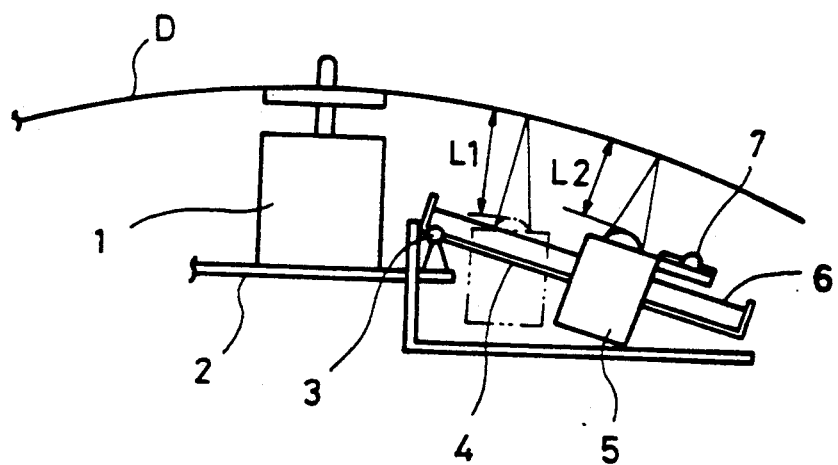
FIG. 10 is a schematic diagram for explaining a state where the optical pickup in the tilt device of FIG. 7 is moved against an optical disc having flexion.

The tilt means is not limited to the one employed in the above described embodiment but may be of another form such as the tilt mechanism shown in FIG. 7 in which the optical pickup is tilted with the feed shafts or the tilt mechanism shown in FIG. 9 in which another shaft is provided in addition to the feed shaft for tilting the optical pickup. In the case where the tilt means as shown in FIG. 7 or 9 is employed, the servo control is made in such a manner that tilting of the feed shaft simulates linearly the flexion of the optical disc. In this case, correction of angle error by an amount corresponding to the linear simulation of flexion by the feed shaft can be achieved.

What is claimed is:

1. A tilt device for an optical head comprising:
   tilt means for flexing a feed shaft disposed in the radial direction of an optical disc and having an optical pickup mounted reciprocably thereon, the tilt means changing the angle of optical axis of the optical pickup as a result of flexing of the feed shaft;
   detection means for detecting a positional relationship between the optical pickup and the optical disc and producing a detection signal representative of the positional relationship; and
   servo means responsive to the detection signal for controlling the tilt means to maintain a desired positional relationship between the optical pickup and the optical disc.

2. A tilt device for an optical head comprising:
   tilt means for tilting a feed shaft disposed in the radial direction of an optical disc and having an optical pickup mounted reciprocably thereon, the tilt means changing the angle of optical axis of the optical pickup;
   detection means for detecting distance between the optical pickup and the optical disc and producing a detection signal; and
   servo means responsive to the detection signal for controlling the tilt means to maintain the distance between the optical pickup and the optical disc constant;
   wherein said feed shaft is fixedly secured to a base frame at its end portion nearer to the center of the optical disc and said tilt means comprises means for moving the other end of the feed shaft to bend in conformity with flexion of the optical disc.

3. A tilt device for an optical head comprising:
   tilt means for tilting a feed shaft disposed in the radial direction of an optical disc and having an optical pickup mounted reciprocably thereon, the tilt means changing the angle of optical axis of the optical pickup;
   detection means for detecting distance between the optical pickup and the optical disc and producing a detection signal wherein said detection means detects the distance between the optical pickup and the optical disc on the basis of a focus drive DC voltage produced by the optical pickup; and
   servo means responsive to the detection signal for controlling the tilt means to maintain the distance between the optical pickup and the optical disc constant.

4. A tilt device as defined in claim 2 wherein said detection means is an optical type sensor comprising photosensors receiving laser beam reflected from the optical disc and detecting the distance between the optical pickup and the optical disc on the basis of difference in amounts of laser beam received by the respective photosensors.

* * * * *